United States Patent [19]

Nawa

[11] Patent Number: 5,699,972
[45] Date of Patent: Dec. 23, 1997

[54] MAGNETIC TAPE APPARATUS FOR ELIMINATING A SLACK OF MAGNETIC TAPE WHEN CHANGING A TAPE WINDING DIRECTION

[75] Inventor: Ikuichiro Nawa, Atsugi, Japan

[73] Assignee: Mitsumi Electric Co., Ltd., Tokyo, Japan

[21] Appl. No.: 671,394

[22] Filed: Jun. 26, 1996

[30] Foreign Application Priority Data

Jun. 29, 1995 [JP] Japan .................. 7-164239

[51] Int. Cl.$^6$ .................................. G11B 15/43
[52] U.S. Cl. ............... 242/334; 242/334.6; 242/355.1; 242/356
[58] Field of Search ............... 242/334, 334.6, 242/356, 356.5, 356.7; 360/96.3, 96.4

[56] References Cited

U.S. PATENT DOCUMENTS

| | | | |
|---|---|---|---|
| 4,814,912 | 3/1989 | Kleinlein et al. | 242/355.1 |
| 5,070,422 | 12/1991 | Sasaki et al. | 360/96.3 |
| 5,167,380 | 12/1992 | Choi | 242/334.6 |
| 5,180,117 | 1/1993 | Katohno et al. | 242/334.6 |
| 5,335,877 | 8/1994 | Sawai et al. | 242/334.6 |
| 5,438,466 | 8/1995 | Koguchi et al. | 242/356 |
| 5,543,980 | 8/1996 | Fukuzawa | 242/334 |

FOREIGN PATENT DOCUMENTS

0091210  10/1983  European Pat. Off.
1526135   9/1978  United Kingdom.

*Primary Examiner*—John P. Darling
*Attorney, Agent, or Firm*—Michael N. Meller

[57] ABSTRACT

A magnetic tape apparatus in which data is recorded on or reproduced from a magnetic tape when the magnetic tape is run on a rotary drum, includes a tension regulating unit which regulates a tension of the magnetic tape when the magnetic tape is run, the tension regulating unit pressing the magnetic tape at a first position in a tension-applying direction. A slack preventing unit exerts a rotating force on the tension regulating unit at a second position such that the rotating force exerted at the second position acts on the tension regulating unit at the first position to further press the magnetic tape in the tension-applying direction, thus preventing a slack of the magnetic tape from being produced when changing a tape winding direction of the magnetic tape.

8 Claims, 5 Drawing Sheets

MAGNETIC TAPE APPARATUS FOR ELIMINATING A SLACK OF MAGNETIC TAPE WHEN CHANGING A TAPE WINDING DIRECTION

BACKGROUND OF THE INVENTION (1) Field of the Invention

The present invention relates to a magnetic tape apparatus in which data is recorded on or reproduced from a magnetic tape, wound on a rotary drum in a range of a winding angle around the rotary drum, when the magnetic tape is run on the rotary drum.

(2) Description of the Related Art

A digital audio tape recorder (DAT) system is a known magnetic tape apparatus. The DAT system includes a tape loading mechanism which pulls out a magnetic tape from a tape cassette and winds the magnetic tape on a rotary drum in a range of a predetermined winding angle (for example, 90°) around the rotary drum. The tape cassette has a supply reel and a take-up reel, and the magnetic tape included in the tape cassette is wound on both the supply reel and the take-up reel. In the DAT system, the magnetic tape pulled out from the tape cassette is pinched by a pinch roller against a capstan, and the magnetic tape is supplied by rotating the capstan while the magnetic tape is pinched by the pinch roller on the capstan.

Generally, the DAT system includes a reel rotating member which is selectively swung to and rotates one of the supply reel and the take-up reel included in the tape cassette. A tape winding direction in which the magnetic tape is supplied or run within the DAT system is changed depending on which one of the supply reel and the take-up reel is rotated by the reel rotating member. A slack of the magnetic tape within the DAT system is produced when changing the tape winding direction of the magnetic tape.

Figure 1A:
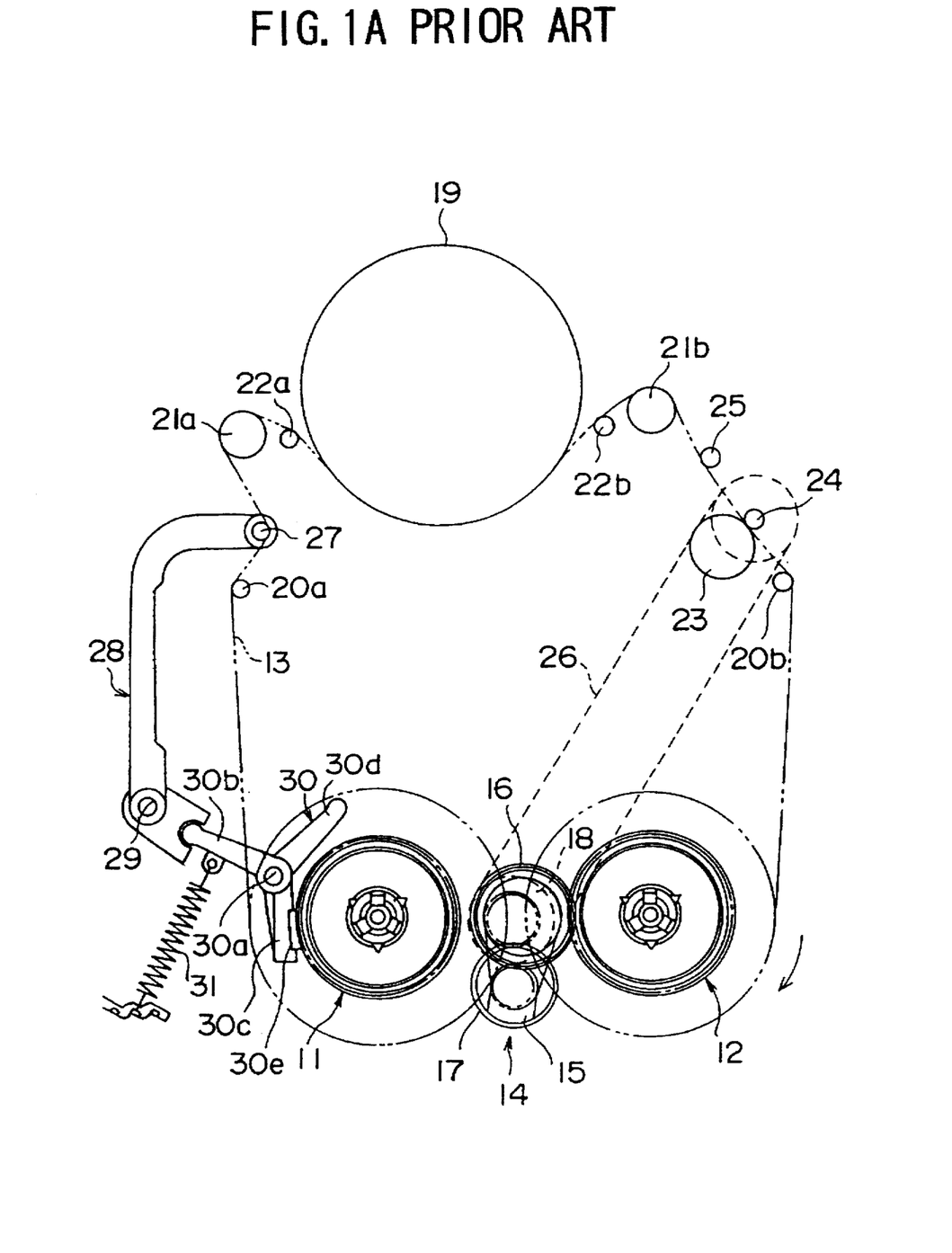
FIGS. 1A and 1B are diagrams of a conventional reel drive device of a magnetic tape apparatus.

FIG. 1A shows a conventional reel drive device of a magnetic tape apparatus. The magnetic tape apparatus is, for example, the above-mentioned DAT system.

Referring to FIG. 1, a magnetic tape 13 is wound on both a supply reel 11 and a take-up reel 12 which are included in a tape cassette (not shown). In the conventional reel drive device, one of the supply reel 11 and the take-up 12 is selectively rotated by a reel rotating member 14. As described above, the tape winding direction of the magnetic tape 13 is changed depending on which one of the supply reel 11 and the take-up reel 12 is rotated by the reel rotating member 14.

The reel rotating member 14 generally has a swing arm 15, a first swing gear 16, a second swing gear 17, and a pulley gear 18. The first swing gear 16, the second swing gear 17 and the pulley gear 18 are rotatably supported on the swing arm 15.

In the conventional reel drive device, as shown in FIG. 1A, the magnetic tape 13 is pinched by a pinch roller 23 against a capstan 24, and the magnetic tape 13 is supplied within the magnetic tape apparatus from the supply reel 11 to the take-up reel 12, or vice versa, by rotating the capstan 24 using a capstan motor (not shown).

A belt 26 is wound on a pulley of the capstan 24 and on the pulley gear 18 of the reel rotating member 14. A rotating force of the capstan 24 generated by the capstan motor is transmitted to the pulley gear 18 through the belt 26. As the pulley gear 18 is rotated by the belt 26 in accordance with the rotation of the capstan 24, the first swing gear 16 is rotated by the pulley gear 18 through the second swing gear 17.

Since the first swing gear 16 is rotated in accordance with the rotation of the capstan 24, one of the supply reel 11 and the take-up 12 is selectively rotated by the reel rotating member 14.

Further, the conventional reel drive device includes a tape loading member which winds the magnetic tape 13, pulled out from the tape cassette, on a rotary drum 19 in the range of the winding angle around the rotary drum 19. When the rotary drum 19 is rotated with the magnetic tape 13 wound thereon, data is recorded on or reproduced from the magnetic tape 13. The tape loading member includes guide posts 20a and 20b, guide rollers 21a and 21b and slanting posts 22a and 22b. As shown in FIG. 1A, the guide posts 20a and 20b, the guide rollers 21a and 21b, and the slanting posts 22a and 22b are arranged on both sides of the rotary drum 19.

The above-mentioned tape loading member pulls out the magnetic tape 13 from the tape cassette and winds the magnetic tape 13 on the rotary drum 19 in the range of the winding angle by using the pinch roller 23, the guide posts 20a and 20b, the guide rollers 21a and 21b and the slanting posts 22a and 22b.

When the magnetic tape 13 is wound on the rotary drum 19 by the tape loading member, the pinch roller 23 presses the magnetic tape 13 against the capstan 24. A fixed post 25 is contacted to the magnetic tape 13 when the magnetic tape 13 is running. The fixed post 25 serves to define a tape running path of the magnetic tape 13.

Further, the conventional reel drive device includes a tension regulator arm 28 which regulates the tension of the magnetic tape 13 when the magnetic tape 13 is running. A tension post 27 is attached to the leading edge of the tension regulator arm 28, and the tension post 27 is arranged between the guide post 20a and the guide roller 21a. As shown in FIG. 1A, the tension post 27 presses the magnetic tape 13 in order to regulate the tension of the magnetic tape 13.

The tension regulator arm 28 is configured to a predetermined shape as shown in FIG. 1A. The tension regulator arm 28 is rotatably supported on a rotating shaft 29. The tension regulator arm 28 is connected at the other end (which is opposite to the tension post 27) to a tension brake 30.

The tension brake 30 includes a rotating shaft 30a, and three arms 30b, 30c and 30d radially extending from the rotating shaft 30a. The tension brake 30 is rotatably supported on the rotating shaft 30a. The arm 30b is connected to the end of the tension regulator arm 28. A brake shoe 30e is attached to the arm 30c, and the brake shoe 30e is contacted to the supply reel 11 to reduce or stop the rotation of the supply reel 11.

In the above tension brake 30, a spring 31 is attached at one end to an intermediate portion of the arm 30b, and the spring 31 is fixed at the other end to a chassis of the magnetic tape apparatus. The spring 31 exerts a rotating force on the arm 30b of the tension brake 30 around the rotating shaft 30a.

The rotating force exerted by the spring 31 on the tension brake 30 is reduced by a reaction force exerted by the magnetic tape 13 on the tension post 27 when the tension post 27 presses the magnetic tape 13. The direction of the moment around the rotating shaft 29 produced by the reaction force on the tension post 27 is opposite to the direction of the moment around the rotating shaft 30a produced by the rotating force of the spring 31 on the tension brake 30.

When the tension of the magnetic tape 13 becomes great, the rotating force of the spring 31 is reduced. The braking force exerted by the brake shoe 30e on the supply reel 11 at that time is reduced. The tension of the magnetic tape 13 is thus regulated by using the tension post 27, the tension regulator arm 28, the tension brake 30 and the spring 31.

In the above conventional reel drive device, when the magnetic tape 13 is supplied from the supply reel 11 to the take-up reel 12 in a winding direction (which is indicated by an arrow in FIG. 1A), the capstan 24 is rotated counter-clockwise by the capstan motor. The rotation of the capstan 24 in the direction makes the reel rotating member 14 be swung to the take-up reel 12. As the first swing gear 16 is rotated in accordance with the rotation of the capstan 24, the take-up reel 12 is rotated clockwise by the first swing gear 16 to supply the magnetic tape 13 in the winding direction. The condition of the conventional reel drive device at this time is shown in FIG. 1A.

On the other hand, when the magnetic tape 13 is supplied from the take-up reel 12 to the supply reel 11 in a rewinding direction (which is opposite to the winding direction), the capstan 24 is rotated clockwise by the capstan motor. The rotation of the capstan 24 makes the reel rotating member 14 be swung to the supply reel 11. The supply reel 11 is rotated counter-clockwise by the first swing gear 16 to supply the magnetic tape 13 in the rewinding direction.

When the direction of the winding of the magnetic tape 13 is changed from the winding direction to the rewinding direction or vice versa, the reel rotating member 14 is required to pass an intermediate position between the reels 11 and 12, at which the first swing gear 16 on the reel rotating member 14 is not engaged with the reel 12 nor with the reel 11. Such a condition of the conventional reel drive device before the reel rotating member 14 reaches the supply reel 11 is shown in FIG. 1B.

Figure 1B:
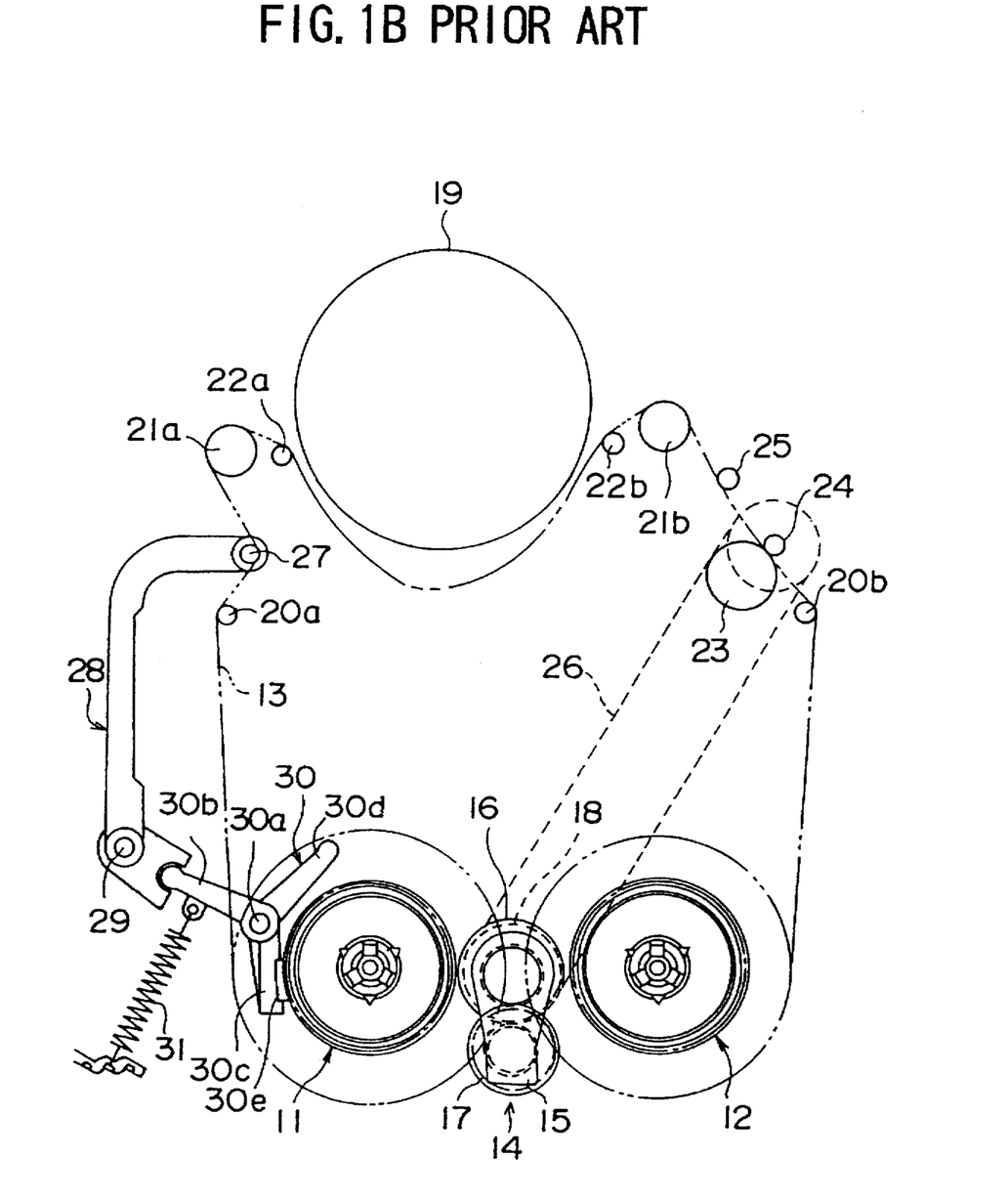

Referring to FIG. 1B, the tape winding direction of the magnetic tape 13 is changed to the rewinding direction in the conventional reel drive device. The reel rotating member 14 is at the intermediate position mentioned above, and the first swing gear 16 is not engaged with the take-up reel 12 nor the supply reel 11. However the capstan 24 is continuously rotated clockwise by the capstan motor even when the reel rotating member 14 is at the intermediate position. The magnetic tape 13 is supplied in the rewinding direction by the rotation of the capstan 24 but the supply reel 11 is not yet rotated by the first swing gear 16. Accordingly, a slack of the magnetic tape 13 between the guide rollers 21a and 21b under the rotary drum 19 is produced at this time.

Since a slack of the magnetic tape 13 is produced when changing the tape winding direction as in the above-described case, the magnetic tape apparatus in which the conventional reel drive device is included cannot access a recorded signal on the magnetic tape 13 when the magnetic tape 13 is not contacted to the rotary drum 19 due to the slack.

In order to prevent the slack of the magnetic tape from being produced, a conceivable method is to add a special slack prevention mechanism to the magnetic tape apparatus. As a matter of course, the special slack prevention mechanism has to efficiently prevent the slack of the magnetic tape from being produced when changing the tape winding direction. However, adding such a mechanism to the magnetic tape apparatus will require an increase in the total number of parts of the magnetic tape apparatus, and an increase in the number of assembly processes required for the magnetic tape apparatus. Therefore, the cost for the magnetic tape apparatus in the above case becomes high.

SUMMARY OF THE INVENTION

An object of the present invention is to provide an improved magnetic tape apparatus in which the above-described problems are eliminated.

Another object of the present invention is to provide a magnetic tape apparatus which efficiently prevents a slack of the magnetic tape from being produced when changing the tape winding direction, and provides the prevention of the slack with a low cost.

A further object of the present invention is to provide a magnetic tape apparatus which reliably records data on and reproduces data from a magnetic tape if a slack prevention mechanism is incorporated therein.

The above-mentioned objects of the present invention are achieved by a magnetic tape apparatus in which data is recorded on or reproduced from a magnetic tape when the magnetic tape is run on a rotary drum, the magnetic tape apparatus comprising: a tension regulating unit regulating a tension of the magnetic tape when the magnetic tape is run, the tension regulating unit pressing the magnetic tape at a first position in a tension-applying direction; and a slack preventing unit, associated with the tension regulating unit, exerting a rotating force on the tension regulating unit at a second position such that the rotating force exerted at the second position acts on the tension regulating unit at the first position to further press the magnetic tape in the tension-applying direction, thus preventing a slack of the magnetic tape from being produced when changing a tape winding direction of the magnetic tape.

It is possible for the magnetic tape apparatus of the present invention to efficiently prevent a slack of the magnetic tape from being produced when changing the tape winding direction. Since only the slack preventing unit is included in the magnetic tape apparatus of the present invention, it is possible to provide the slack prevention for the magnetic tape apparatus with a low cost. Further, it is possible for the magnetic tape apparatus of the present invention to reliably carry out the recording and/or reproducing of data since the slack of the magnetic tape is always eliminated.

BRIEF DESCRIPTION OF THE DRAWINGS

The above and other objects, features and advantages of the present invention will become more apparent from the following detailed description when read in conjunction with the accompanying drawings in which.

DETAILED DESCRIPTION OF THE PREFERRED EMBODIMENT

A description will now be given of the preferred embodiment of the present invention with reference to the accompanying drawings.

Figure 2:
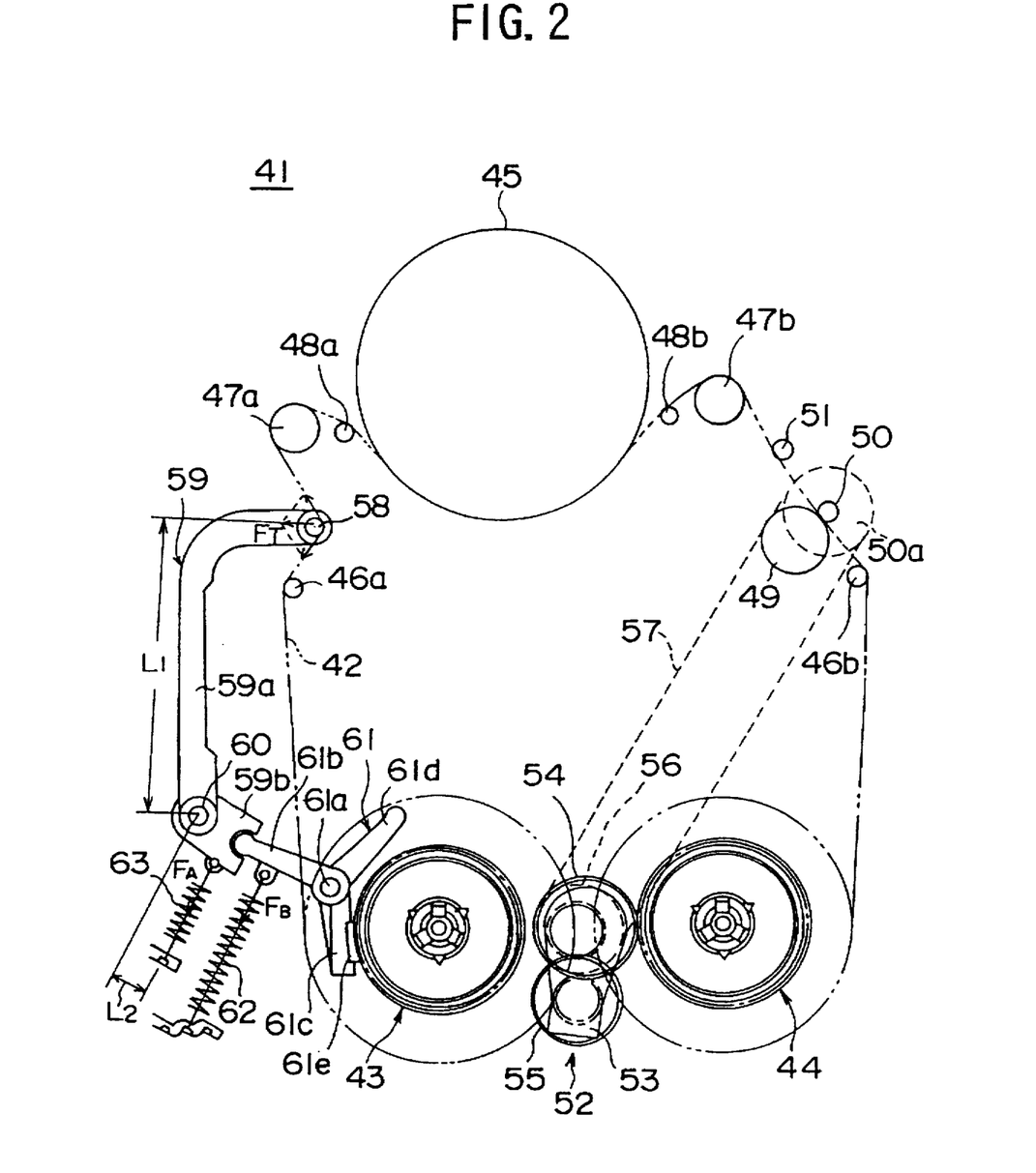
FIG. 2 is a diagram of a reel drive device of a magnetic tape apparatus in one embodiment of the present invention.

FIG. 2 shows a reel drive device 41 of a magnetic tape apparatus in one embodiment of the present invention. In the magnetic tape apparatus of the present embodiment, data is recorded on or reproduced from a magnetic tape while the magnetic tape, wound on a rotary drum in a range of a predetermined winding angle around the rotary drum, is run on the rotary drum. The reel drive device shown in FIG. 2 can be applied to a digital audio tape recorder (DAT) system, a video tape recorder (VTR) system, or any other magnetic tape recorder system.

Referring to FIG. 2, a magnetic tape 42 is wound on a supply reel 43 and a take-up reel 44, which are included in a tape cassette (not shown). If the tape cassette is inserted into the magnetic tape apparatus, the reel drive device 41 carries out a tape loading operation. The reel drive device 41 generally has a rotary drum 45, guide posts 46a and 46b, guide rollers 47a and 47b, slanting posts 48a and 48b, and a pinch roller 49. The guide posts 46a and 46b, the guide rollers 47a and 47b and the slanting posts 48a and 48b are arranged on both sides of the rotary drum 45. The pinch roller 49 is arranged on the take-up reel's side of the tape cassette.

When the tape loading is performed, the reel drive device 41 pulls out the magnetic tape 42 from the tape cassette and winds the magnetic tape 42 on the rotary drum 45 by using the guide posts 46a and 46b, the guide rollers 47a and 47b and the slanting posts 48a and 48b. The pinch roller 49 presses the magnetic tape 42, taken from the take-up reel 44, against a capstan 50. The capstan 50 on which the magnetic tape 42 is pinched by the pinch roller 49 is rotated by a capstan motor (not shown), so that the magnetic tape 42 is supplied in accordance with the rotation of the capstan 50 on a tape running path within the magnetic tape apparatus.

The capstan 50 is rotated counter-clockwise by the capstan motor when one of a record mode, a play mode, a search mode and a fast-feed mode of the magnetic tape apparatus is selected. The capstan 50 is rotated clockwise by the capstan motor when a rewind mode of the magnetic tape apparatus is selected.

A fixed post 51 is contacted to the magnetic tape 42 when the magnetic tape 42 is running. The fixed post 51 serves to define the tape running path of the magnetic tape 42.

The rotary drum 45 is associated with a recording head (not shown) and a reproducing head (not shown) when the magnetic tape 42 is run on the rotary drum 45. The rotary drum 45 is rotated in accordance with the speed of the running of the magnetic tape 42. In the magnetic tape apparatus, data is recorded on or reproduced from the magnetic tape 42 by using the recording head or the reproducing head when the magnetic tape 42 is run on the rotary drum 45.

One of the supply reel 43 and the take-up reel 44, included in the tape cassette, is selectively rotated by a reel rotating member 52. The reel rotating member 52 includes a swing arm 53, a first swing gear 54, a second swing gear 55, and a pulley gear 56. The first swing gear 54, the second swing gear 55 and the pulley gear 56 are rotatably supported on the swing arm 53. A belt 57 is wound on a pulley 50a of the capstan 50 at one end and wound on the pulley gear 56 at the other end.

The rotating force of the capstan 50 is transmitted from the pulley 50a to the pulley gear 56 via the belt 57. As the pulley gear 56 is rotated by the capstan 50, the first swing gear 54 is rotated by the pulley gear 56 via the second swing gear 55. Therefore, the first swing gear 54 is rotated in accordance with the rotation of the capstan 50.

The first swing gear 54 is engaged with one of the supply reel 43 and the take-up reel 44 in accordance with the movement of the swing arm 53. Accordingly, one of the supply reel 43 and the take-up reel 44 is selectively rotated by the reel rotating member 52 through the rotation of the first swing gear 54.

A tension post 58 is provided between the guide post 46a and the guide roller 47a, and the tension post 58 presses the magnetic tape 42 in a tension-applying direction in order to regulate the tension of the magnetic tape 42. The point of application of the pressing force of the tension post 58 will be referred to as a first position.

A tension regulator arm 59 has a first arm 59a and a second arm 59b which are integrally formed. The first arm 59a is an L-shaped member. The tension post 58 is attached to the leading edge of the first arm 59a of the tension regulator arm 59. The tension regulator arm 59 is rotatably supported on a rotating shaft 60. The rotating shaft 60 is provided at one end of the second arm 59b, and the second arm 59b is connected at the other end to a tension brake 61.

The tension brake 61 includes a rotating shaft 61a, and three arms 61b, 61c and 61d radially extending from the rotating shaft 61a. The tension brake 61 is rotatably supported on the rotating shaft 61a. The arm 61a is connected to the tension regulator arm 59. A brake shoe 61e is attached to the arm 61c, and the brake shoe 61e is contacted to the supply reel 43 to reduce or stop the rotation of the supply reel 43.

In the tension brake 61, a first spring 62 is attached at one end to an intermediate portion of the arm 61b, and the first spring 62 is fixed at the other end to a chassis (not shown in FIG. 2) of the magnetic tape apparatus. The first spring 62 exerts a rotating force FB on the arm 61b of the tension brake 61 around the rotating shaft 61a.

A second spring 63 is attached at one end to the second arm 59b of the tension regulator arm 59, and the second spring 63 is fixed at the other end to the chassis of the magnetic tape apparatus. The second spring 63 exerts a rotating force FA on the second arm 59b of the tension regulator arm 59 around the rotating shaft 60. The point of application of the rotating force FA on the tension regulator arm 59 will be referred to as a second position.

The tension post 58, the tension regulator arm 59, the tension brake 61, and the first spring 62 constitute a tension regulating unit in the present embodiment. The second spring 63 constitutes a slack preventing unit in the present embodiment.

The rotating force FB exerted by the first spring 62 on the tension brake 61 is reduced by a reaction force FT exerted by the magnetic tape 42 on the tension post 58 when the tension post 58 presses the magnetic tape 42. The reaction force FT acts to rotate the tension regulator arm 59 counter-clockwise around the rotating shaft 60. On the other hand, the rotating force FB acts to rotate the tension regulator arm 59 clockwise around the rotating shaft 60. In other words, the direction of the moment around the rotating shaft 60 produced by the reaction force FT is opposite to the direction of the moment around the rotating shaft 61a produced by the rotating force FB of the first spring 62.

When the tension of the magnetic tape 42 becomes great, the rotating force FB of the first spring 62 is reduced. The braking force exerted by the brake shoe 61e on the supply reel 43 at this time is reduced. When the tension of the magnetic tape 42 becomes small, the rotating force FB of the first spring 62 is increased. The braking force exerted by the brake shoe 61e on the supply reel 43 at this time is increased. The tension of the magnetic tape 42 is thus regulated by the cooperative functions of the tension post 58, the tension regulator arm 59, the tension brake 61 and the first spring 62.

In the present embodiment, even when a slack of the magnetic tape 42 tends to be produced at the time of changing of the tape winding direction, the rotating force FA of the second spring 63 is always exerted on the tension regulator arm 59 at the second position to rotate the tension regulator arm 59 clockwise around the rotating shaft 60. The rotating force FA exerted at the second position acts on the tension regulator arm 59 at the first position to further press the magnetic tape 42 in the tension-applying direction. Accordingly, in the present embodiment, the slack of the magnetic tape 42 is always eliminated by the second spring 63 even when changing the tape winding direction.

Next, a setting of the physical property of the second spring 63 which is appropriate for the magnetic tape apparatus of the present embodiment will be described.

A condition of the magnetic tape apparatus in which the reaction force FT of the magnetic tape 42 acts on the tension post 58 of the tension regulator arm 59 at the first position as shown in FIG. 2 is now taken into consideration. Since the tension of the magnetic tape 42 is regulated by the tension regulator unit, the rotating force FA of the second spring 63 exerted at the second position is defined by the formula: $FT \cdot L1 > FA \cdot L2$, where L1 is a distance between the rotating shaft 60 and the first position (or the point of application of the reaction force FT), L2 is a distance between the rotating shaft 60 and the second position (or the point of application of the rotating force FA), and FT is the reaction force of the magnetic tape 42 acting on the tension regulator arm 59.

Accordingly, in the case of the magnetic tape apparatus of the present embodiment, it is necessary to set an appropriate value of the physical property of the second spring 63 so as to satisfy the above formula.

Figure 3:
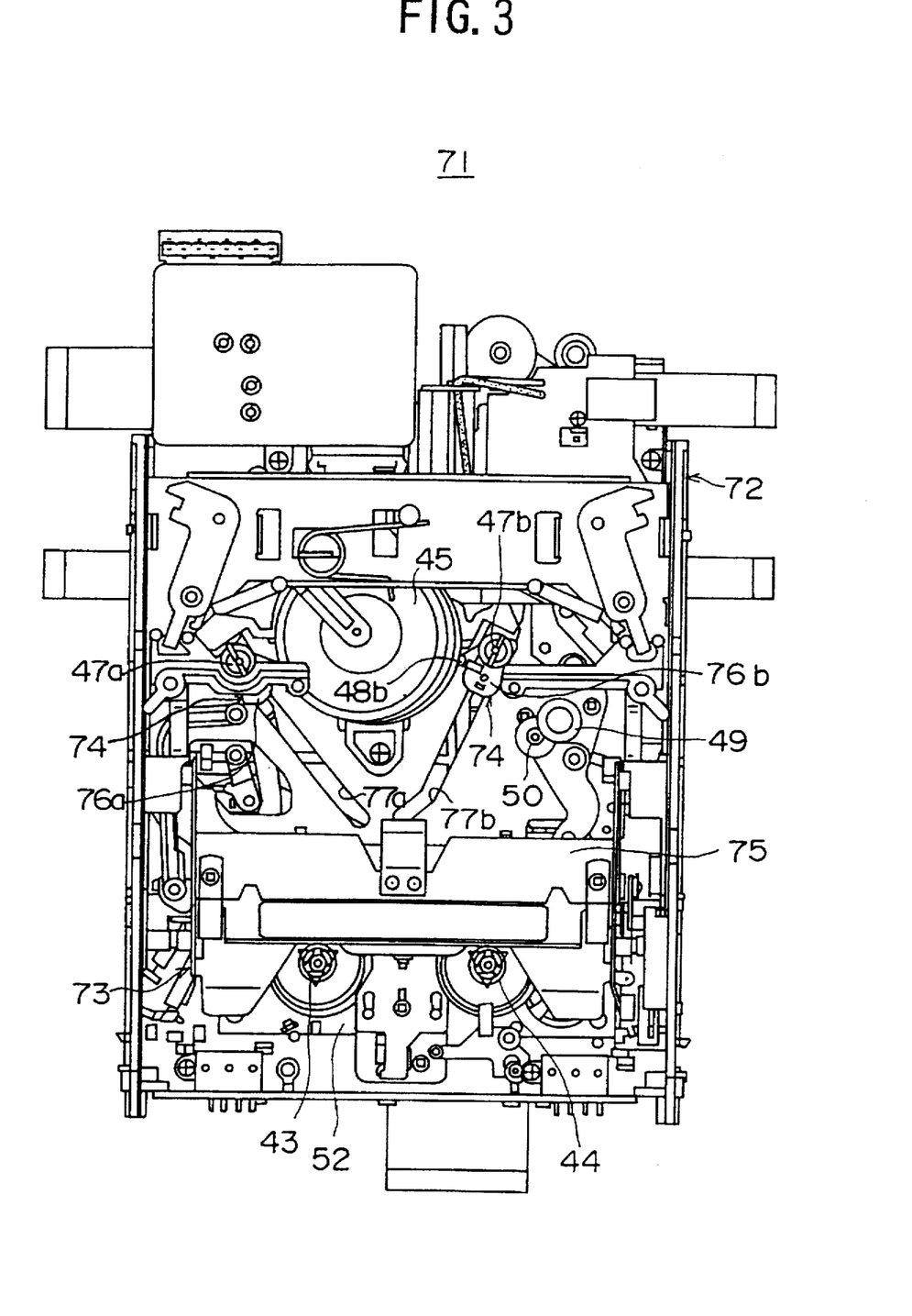
FIG. 3 is a plan view of the magnetic tape apparatus of the present embodiment in which the reel drive device is included.

FIG. 3 shows a digital audio tape recorder (DAT) system 71 in which the reel drive device of the present embodiment is included.

Referring to FIG. 3, the DAT system 71 generally has a chassis 72, a cassette loading member 73, the reel rotating member 52, the rotary drum 45, and a tape loading member 74. The elements 73, 52, 45 and 74 of the DAT system 71 are arranged on the chassis 72. The arrangement of the elements is improved to simplify assembly processes for the DAT system 71 such that the elements can be attached to the top of the chassis 72 during the assembly.

The cassette loading member 73 sets a tape cassette (not shown) at a read/write position within the DAT system 71 when the tape cassette is inserted into a cassette holder 75. The cassette holder 75 is lowered from an insertion position when the tape cassette is inserted, so that the tape cassette held by the cassette holder 75 is set at the read/write position. When the tape cassette is ejected, the cassette holder 75 is raised to the insertion position, so that the tape cassette can be taken out or inserted again.

As described above, the reel rotating member 52 is provided to selectively rotate one of the supply reel 43 and the take-up reel 44. A rotation source of the reel rotating member 52 is the capstan motor (not shown). The rotating speed and direction of one of the supply reel 43 and the take-up reel 44 are controlled by using the capstan motor in accordance with a selected operating mode of the DAT system 71 (which is one of the record mode, the play mode, the fast-feed mode, the rewind mode and the search mode).

The tape loading member 74 pulls out the magnetic tape 42 from the tape cassette and winds the magnetic tape 42 on the rotary drum 45 in the range of the predetermined winding angle (which is 90° in this embodiment) around the rotary drum 45. The tape loading member 74 includes a link mechanism (not shown), loading bases 76a and 76b, and guide grooves 77a and 77b. The link mechanism moves the loading bases 76a and 76b along the guide grooves 77a and 77b, and the magnetic tape 42 is loaded or unloaded by the movement of the link mechanism.

The guide roller 47a and the slanting post 48a are mounted on the loading base 76a, and the guide roller 47b and the slanting post 48b are mounted on the loading base 76b. Therefore, when the loading bases 76a and 76b are moved along the guide grooves 77a and 77b, the guide rollers 47a and 47b and the slanting posts 48a and 48b pull out the magnetic tape 42 from the tape cassette and winds the magnetic tape 42 on the rotary drum 45 in the range of the predetermined winding angle around the rotary drum 45. The tape-loaded condition of the DAT system 71 is shown in FIG. 3.

When the DAT system 71 is in the tape-loaded condition shown in FIG. 3, the positions of the loading bases 76a and 76b are located by locating parts (not shown). The locating parts are attached to the rotary drum 45. The loading bases 76a and 76b are contacted to the locating parts, so that the positions of the loading bases 76a and 76b are located by the locating parts.

In the present embodiment, the reel drive device 41 in FIG. 2 is included in the above DAT system 71. When the reel drive device 41 is in the condition shown in FIG. 2, the magnetic tape 42 is supplied from the supply reel 43 to the take-up reel 44 in a winding direction. As described above, one of the record mode, the play mode, the search mode and the fast feed mode of the DAT system 71 is selected at this time. The capstan 50 is rotated counter-clockwise by the capstan motor, and the swing arm 53 of the reel rotating member 52 is swung to the take-up reel 44 so that the take-up reel 44 is rotated clockwise by the first swing gear 54.

On the other hand, when the magnetic tape 42 is supplied from the take-up reel 44 to the supply reel 43 in a rewinding direction which is reverse to the above-mentioned winding direction. As described above, the rewind mode is selected on the DAT system 71 at this time. The capstan 50 is rotated clockwise by the capstan motor, and the swing arm 53 of the reel rotating member 52 is swung to the supply reel 43 so that the supply reel 43 is rotated counter-clockwise by the first swing gear 54.

Figure 4:
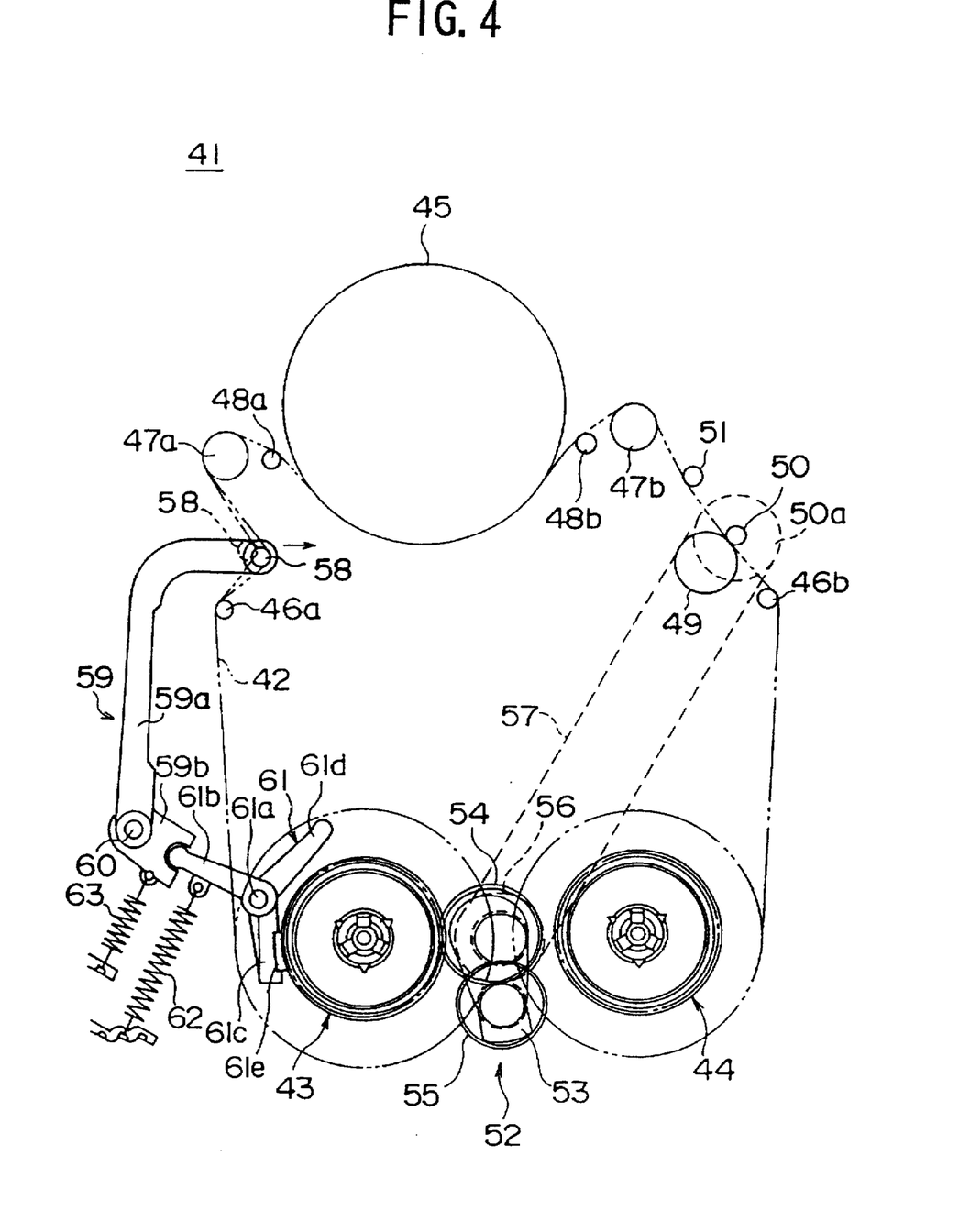
FIG. 4 is a diagram for explaining an operation of the magnetic tape apparatus of the present embodiment to eliminate the slack of the magnetic tape when changing the tape winding direction.

FIG. 4 is a diagram for explaining the operation of the magnetic tape apparatus of the present embodiment to eliminate a slack of the magnetic tape when changing the tape winding direction.

When the reel drive device 41 is in the condition shown in FIG. 2, the tension of the magnetic tape 42 is regulated by the tension regulating unit. In this condition, the magnetic tape 42 is supplied in the winding direction, and the rotating force FB of the first spring primarily acts on the tension regulator arm 59.

Referring to FIG. 4, when the tape winding direction is changed to the rewinding direction, the capstan 50 is rotated clockwise reversely to the previous rotating direction. The reel rotating member 52 is swung toward the supply reel 43 and passes an intermediate position at which the first swing gear 54 is not engaged with the supply reel 43 nor the take-up reel 44. When the reel rotating member 52 is at the intermediate position, the first swing gear 54 is rotated clockwise in accordance with the rotation of the capstan 50 while the magnetic tape 42 is supplied by the capstan 50 in the rewinding direction. However, the supply reel 43 at this time is not rotated by the first swing gear 54, and the magnetic tape 42 between the guide rollers 47a and 47b under the rotary drum 45 tends to slack as shown in FIG. 1B. In addition, the rotating force FB of the first spring 62 at this time does not act on the tension regulator arm 59 since the supply reel 43 is not rotated and the braking force of the tension brake 61 is not produced.

In the present embodiment, even when the slack of the magnetic tape 42 tends to be produced, the rotating force FA of the second spring 63 exerted at the second position acts on the tension post 58 of the tension regulator arm 59 at the first position to press the magnetic tape 42 in the tension-applying direction, as indicated by an arrow in FIG. 4. Therefore, it is possible for the magnetic tape apparatus of the present embodiment to efficiently prevent the slack of the magnetic tape 42 from being produced when changing the tape winding direction.

As described above, it is possible for the magnetic tape apparatus of the present invention to efficiently prevent a slack of the magnetic tape from being produced when changing the tape winding direction. Since only the second spring 63 is included in the magnetic tape apparatus as the slack preventing unit, it is possible to provide the slack prevention for the magnetic tape apparatus with a low cost. Further, it is possible for the magnetic tape apparatus of the present invention to reliably carry out the recording and/or reproducing of data since the slack of the magnetic tape is always eliminated. Even when the changing of the tape winding direction is repeated, it is possible for the magnetic tape apparatus of the present invention to access a recorded signal on the magnetic tape without missing of the recorded signal.

What is claimed is:

1. A magnetic tape apparatus in which data is recorded on or reproduced from a magnetic tape when the magnetic tape is run on a rotary drum, said apparatus comprising:

a tension regulating unit regulating a tension of the magnetic tape when the magnetic tape is run, said tension regulating unit pressing the magnetic tape at a first position in a tension-applying direction; and a slack preventing unit, associated with said tension regulating unit, exerting a rotating force on said tension regulating unit at a second position such that said rotating force exerted at the second position acts on said tension regulating unit at the first position to further press the magnetic tape in the tension-applying direction, thus preventing a slack of the magnetic tape from being produced when changing a tape winding direction of the magnetic tape.

2. The apparatus according to claim 1, wherein said tension regulating unit comprises a tension regulator arm rotatably supported on a rotating shaft, a tension post attached to an end of said tension regulator arm, a tension brake connected to an opposite end of said tension regulator arm, and a first spring connected to a portion of said tension brake, said tension post pressing the magnetic tape at the first position in the tension-applying direction.

3. The apparatus according to claim 1, wherein said tension regulating unit comprises a tension regulator arm rotatably supported on a rotating shaft, and a tension post attached to said tension regulator arm, said tension post pressing the magnetic tape in the tension-applying direction at the first position.

4. The apparatus according to claim 1, wherein the magnetic tape is wound on the rotary drum in a range of a predetermined rotating angle around the rotary drum.

5. The apparatus according to claim 1, wherein said slack preventing unit comprises a spring attached to said tension regulating unit at said second position and fixed to a chassis of said apparatus, said spring exerting the rotating force on said tension regulating unit at the second position.

6. The apparatus according to claim 1, wherein said magnetic tape apparatus further comprises:

a reel rotating member which selectively rotates one of a supply reel and a take-up reel, included in a tape cassette, said reel rotating member including a swing arm, a swing gear rotatably supported on said swing arm, and a belt wound on a pulley of a capstan and connected to said swing gear.

7. The apparatus according to claim 6, wherein said swing arm is swung to one of the supply reel and the take-up reel in accordance with a direction of rotation of the capstan, and said swing gear is rotated by said belt in accordance with the rotation of the capstan, said swing gear selectively rotating one of the supply reel and the take-up reel in accordance with a swinging movement of the swing arm.

8. A magnetic tape apparatus in which data is recorded on or reproduced from a magnetic tape when the magnetic tape is run on a rotary drum, said apparatus comprising:

a tension regulating unit regulating a tension of the magnetic tape when the magnetic tape is run, said tension regulating unit pressing the magnetic tape at a first position in a tension-applying direction; and a slack preventing unit, associated with said tension regulating unit, exerting a rotating force on said tension regulating unit at a second position such that said rotating force exerted at the second position acts on said tension regulating unit at the first position to further press the magnetic tape in the tension-applying direction, thus preventing a slack of the magnetic tape from being produced when changing a tape winding direction of the magnetic tape wherein said tension regulating unit comprises a tension regulator arm rotatably supported on a rotating shaft, and a tension post attached to said tension regulator arm, said tension post pressing the magnetic tape in the tension-applying direction at the first position, and wherein said slack preventing unit exerts a rotating force FA on said tension regulator arm at the second position, said rotating force FA being defined by the formula: $FT \cdot L1 > FA \cdot L2$, where FT is a reaction force of the magnetic tape on said tension post, L1 is a distance between the rotating shaft and the first position, and L2 is a distance between the rotating shaft and the second position.

* * * * *